(12) United States Patent
Hayes

(10) Patent No.: US 6,529,006 B1
(45) Date of Patent: Mar. 4, 2003

(54) METHOD AND APPARATUS FOR RESOLVING THE POSITION AND IDENTITY OF BURIED CONDUCTIVE BODIES

(76) Inventor: Paul Hayes, 400 N. Allen Ave., Richmond, VA (US) 23220

( * ) Notice: Subject to any disclaimer, the term of this patent is extended or adjusted under 35 U.S.C. 154(b) by 0 days.

(21) Appl. No.: 09/984,755

(22) Filed: Oct. 31, 2001

(51) Int. Cl.[7] ................................ G01V 3/10
(52) U.S. Cl. .................................... 324/326
(58) Field of Search ............. 324/67, 326–329, 324/243, 263, 345

(56) References Cited

U.S. PATENT DOCUMENTS

| | | |
|---|---|---|
| 3,418,572 A | 12/1968 | Humphreys, Jr. |
| 3,991,393 A * | 11/1976 | Becker, Jr. .................. 336/30 |
| 4,295,095 A | 10/1981 | Thomas et al. |
| 4,387,340 A | 6/1983 | Peterman |
| 4,427,942 A | 1/1984 | Sole |
| 4,438,389 A | 3/1984 | De Sa |
| 4,506,210 A | 3/1985 | Chase |
| 4,520,317 A | 5/1985 | Peterman |
| 4,542,344 A | 9/1985 | Darilek et al. |
| 4,639,674 A | 1/1987 | Rippingale |
| 4,818,944 A | 4/1989 | Rippingale |
| 4,843,324 A | 6/1989 | Humphreys, Jr. et al. |
| 5,093,622 A | 3/1992 | Balkman |
| 5,361,029 A | 11/1994 | Rider et al. |
| 5,365,163 A | 11/1994 | Satterwhite et al. |
| 5,418,447 A | 5/1995 | Beha et al. |
| 5,471,143 A | 11/1995 | Doany |
| 5,640,092 A | 6/1997 | Motazed et al. |
| 5,754,049 A | 5/1998 | Howell |
| 6,051,977 A * | 4/2000 | Masuda et al. .............. 324/326 |
| 6,140,819 A | 10/2000 | Peterman et al. |
| 6,211,807 B1 | 4/2001 | Wilkison |
| 6,215,888 B1 | 4/2001 | Eslambolchi et al. |
| 6,268,731 B1 * | 7/2001 | Hopwood et al. .......... 324/247 |

* cited by examiner

Primary Examiner—Jay Patidar
(74) Attorney, Agent, or Firm—Bacon & Thomas

(57) ABSTRACT

Both location and identification of a buried or otherwise hidden conductive body is achieved by impressing a known electromagnetic waveform upon the conductive body, using at least one sensor to detect radiation emitted by the conductive body in response to the impressed waveform, locating the source of the emitted waveform based on comparison of the amplitudes of signals received by the at least two sensors, and evaluating the emitted radiation for deviations from the impressed waveform in order to determine the pattern of distortion caused by the conductive body and thereby identify the conductive body.

21 Claims, 4 Drawing Sheets

METHOD AND APPARATUS FOR RESOLVING THE POSITION AND IDENTITY OF BURIED CONDUCTIVE BODIES

BACKGROUND OF THE INVENTION

1. Field of the Invention

This invention relates to a method and apparatus for determining the horizontal and/or vertical location of a buried or otherwise hidden conductive body such as a pipe, wire, cable, storage tank, or drum.

The invention also relates to a method and apparatus for identifying a buried conductive body, even when located in close proximity with other buried conductive bodies.

According to the invention, location and identification of a conductive body is achieved by impressing a known electromagnetic waveform upon the conductive body, detecting radiation emitted by the conductive body in response to the impressed waveform, locating the source of the emitted waveform by evaluating the amplitudes of signals received by at least one sensor,-and evaluating the waveforms of the received signals for deviations from the impressed waveform in order to determine the pattern of distortion caused by the conductive body and thereby identify the conductive body.

2. Description of Related Art

There are several situations where improved apparatus and methods of locating and identifying buried conductive bodies are needed.

One such situation involves location of underground utilities that may be present at a construction site. Before construction or excavation of a parcel of land, it is often necessary for the owners of buried utility systems in the area to mark out on the ground surface the exact location of their buried facilities. This prevents the construction or excavation from accidentally disrupting utility service, and reduces the chance that serious injury or property damage could occur as a result of unintentional contact between the digging equipment and buried facilities such as gas lines and electrical cables.

Another situation in which improved location and identification of buried conductive bodies is needed is the situation where a parcel of land may include underground storage tanks or drums containing hazardous waste. In that situation, location and identification of the tanks or drums is required for the purpose of assessing environmental risks or as part of a clean-up effort.

Most of the related prior art is directed to location rather than identification of buried conductive bodies. Location of buried conductive bodies is generally accomplished by electromagnetic detection systems and methods, although ground penetrating radar and seismic or acoustic detection methods have also been proposed. Identification of the buried conductive bodies, on the other hand, is carried out by combining the results of the electromagnetic detection with a review of records and plats. In order to ensure that all active services or buried facilities of interest have been detected and marked, the locator personnel must compare information obtained from the electromagnetic detection to that contained on the records. In this manner, the locator can determine if all active services or other buried facilities of interest have been located.

Conventional electromagnetic detection systems and methods generally fall into one of two categories. The first category includes active detection systems and methods in which a signal generator is used to place a signal directly on the structure. The second category includes passive detection systems and methods, in which a signal naturally present on the structure is used. The systems of both categories include a receiver designed to detect and evaluate the electromagnetic field radiated from the object and infer its location.

Systems and methods for locating buried conductors based on electromagnetic detection, i.e., on an analysis of radiation emitted by the conductors (either in response to currents normally carried by the conductors in the case of underground utility lines, or in response to an applied signal) are disclosed in U.S. Pat. Nos. 6,215,888 (Eslambolchi et al.); 6,211,807 (Wilkison); 6,140,819 (Peterman et al.); 5,754,049 (Howell); 5,640,092 (Motazed et al.); 5,471,143 (Doany); 5,418,447 (Beha et al.); 5,365,163 (Satterwhite et al.); 5,361,029 (Rider et al.); 5,093,622 (Balkman); 4,843,324 (Humphreys et al.); 4,818,944 (Rippingale); 4,639,674 (Rippingale); 4,542,344 (Darilek et al.); 4,438,389 (De Sa); 4,427,942 (Sole); 4,520,317 (Peterman); 4,506,210 (Chase); 4,387,340 (Peterman); 4,295,095 (Thomas et al.); and 3,418,572 (Humphreys)

As evidenced by the length of this list of patents, which is by no means an exclusive listing, the problem of locating buried conductors has been of substantial concern for a number of years, and continues to be so today. Despite all of the attention given the problem, however, the failure of existing active and passive systems and methods to locate and/or identify buried utility services or other hidden conductors continues to result in significant property damage and injuries, as well as economic losses and consequential damages due to unintended utility service disruption.

Among the problems which limit the effectiveness of existing active systems is the problem of "signal bleed," in which a signal placed on the conductive body migrates to other conductive bodies, thus rendering the conductive body of interest undetectable, or at the very least indistinguishable from the interfering conductive bodies. This problem is particularly acute in the case of utility services, which tend to be located in densely packed conduits or corridors.

When a signal is coupled to a conductive body, it will form a circuit via the path of least resistance. In many cases the path of least resistance will be through a conductive body other than the conductive body of interest. Complicating the situation in the case of utility services is the fact that many utility systems share common grounding points, making isolation of individual services almost impossible. This is a very common occurrence in today's congested utility corridors, which makes locating the more deeply buried services quite difficult. Lowering the frequency of the injected signal can reduce the amount of inductive signal bleed, but at the cost of higher power consumption, and does little to solve the problem when there are common grounding points. Low frequency signals, i.e., signals having frequencies of less than approximately 8 kHz, are also difficult to induce onto buried services, and do not travel far on poorly conductive services such as those made from iron.

Passive detection systems and methods suffer from serious shortcomings as well. First, the amount of naturally occurring signals present on a given service may be insufficient to provide for a reliable detection, and second, there is no way to differentiate one service from the next. This makes passive detection techniques unsuitable for the bulk of service detection needs, particularly when dangerous services such as gas and electric utilities are involved, and of course passive detection cannot be used to detect buried conductive bodies such as storage tanks that do not carry detectable electric signals.

In general, the prior systems and methods described in the above-listed patents are best suited to location of isolated conductive bodies that can be identified by other methods, such as by a review of records or plats. The basic concept of these systems and methods is to use multiple sensors to sense the amplitude of signals ostensibly radiated by a conductive body of interest, and to use basic geometric principles to resolve the position of the radiating conductive body based on differences in amplitude between the sensed signals.

Of all of the patents listed above, only one of these patents, U.S. Pat. No. 5,754,049 (Howell), even attempts to both identify and locate conductive bodies, as in the present invention. This patent discloses a system and method which, like that of the present invention, relies on analysis of the effect of the conductive bodies on impressed signals, rather than just detection of signal amplitudes. In particular, this patent discloses use of a radio transmitter to apply signals of two or more different sine waves of discrete frequencies to a buried conductor, such as a pipe, or to analyze the spectra of naturally occurring radiated signals. While similar to the approach taken by the present invention—the difference lies primarily in the power and duration or shape of the applied signals—the method and apparatus described in U.S. Pat. No. 5,754,049 suffers a number of deficiencies which make the method and apparatus impractical.

First, the apparatus described in U.S. Pat. No. 5,754,049 is essentially "passive," i.e., it relies upon signals placed on the conductors by chance, such as by radio transmitters, electric motors, or the like, rather than an active system in which a known waveform is directly applied to the utility of interest. Not all buried conductors will be exposed to a unique set of frequencies to which it is partially resonant. Shorter conductors, such as those consisting of short sections of insulated pipe, will exhibit little tendency to pick up and reradiate ubiquitous electromagnetic energy, and therefore cannot be located or identified with the device disclosed in this patent. Furthermore, the low levels of such passively induced signals make it unlikely that the apparatus will be effective on very deeply buried utilities.

Second, if the apparatus and method disclosed in U.S. Pat. No. 5,574,049 were modified to use a relatively high power signal operating in the active mode, the resulting method and apparatus would have very limited applicability due to lack of speed. The lack of speed results from the requirement that the transmitted signal be swept through the frequency range while performing a fast Fourier transform (FFT) at a multitude of discrete steps. This "tuning" process is very slow but is necessary to enable the equivalent circuit that uniquely identifies each utility to be deduced. Essentially, the apparatus treats the utility as an RLC Q spoiled tuned circuit. Therefore, it is necessary for several or even several hundred cycles of a given frequency to be transmitted for the signal to be present and stable on the utility and then one full cycle received by the instrument, before a true response can be evaluated. The lower the frequency, the longer this takes. As a result, operation of the apparatus of U.S. Pat. No. 5,574, 049 as an active system would be virtually impossible in most situations, particularly if the apparatus is intended to be portable rather than stationary, i.e., if it is to be moved while searching for conductors.

This inherent slowness is compounded by the fact that as the frequency drops, it takes more power to transmit the same magnitude signal, and more power must be present on the utility to re-radiate the same magnitude signal. Consequently, transmitting and evaluating the results of the swept frequency scheme is also very difficult, compounding the problem of length of time to gather those results.

All of the embodiments described in U.S. Pat. No. 5,754, 049 evaluate a continuous sine wave of a particular frequency, whether naturally present or introduced. In contrast, the system and method of the present invention evaluates a specific signal averaged waveform of short duration, and thus exhibits no time lag in that a single 500 ns pulse is all that is required to evaluate the distortion produced by the utility. No attempt is made to seek a unique frequency as in U.S. Pat. No. 5,754,049.

Furthermore, the device of the invention provides a known waveform with a peak instantaneous power of several thousand watts, which can be coupled directly to the utility. This energy easily jumps the insulators on pipes as described above, and allows deeply buried conductors to be located. The use of a short pulse having sufficiently high power to jump the insulators on pipes and locate and identity the pipes, or other insulated conductors, without prior knowledge of either location or identity, differentiates the invention from each of the utility location tools described in U.S. Pat. No. 5,754,049 and the other patents listed above.

While it is true that the apparatus disclosed in U.S. Pat. No. 5,754,049, like that of the present invention, might use a type of spectral or waveform analysis, it is used in a different way for a different purpose than the waveform analysis of the present invention. The apparatus of U.S. Pat. No. 5,754,049 uses spectral analysis as a way of discovering what particular set of frequencies a utility is carrying. In contrast, the present invention uses waveform analysis, which may include but is not limited to spectral analysis, as a way of analyzing the distortion a given utility produces on the known transmitted waveform.

Finally, it is noted that use of waveform distortion analysis to identify conductors is described in U.S. Pat. No. 6,215,888, but the system and method disclosed in this patent requires prior knowledge of conductor location and is not suitable for both location and identification of conductors. To date, despite the long-felt need, the only practical system and method for effectively identifying and locating buried or otherwise hidden conductive bodies is believed to be that of the present invention.

SUMMARY OF THE INVENTION

It is accordingly a first objective of the invention to provide a system (or apparatus) and method for locating conductors that can both locate and identify a conductor in one operation.

It is a second objective of the invention to provide an apparatus for locating conductors that can locate and identify utilities while being moved across the ground surface.

It is a third objective of the invention to provide a system and method that can reliably locate and provide identification of utility services, even when there are many conductors present and in close proximity.

It is a fourth objective of the invention to provide a system and method that can not only resolve closely spaced conductors, but positively identify them, i.e., determine size, type, function, and information, and yet that is cost effective and practical for use in such real-world applications as the location of buried utilities or underground storage tanks and drums.

These objectives are achieved by providing a system and method for locating and identifying conductive bodies in which a known signal is injected into a specific conductive body, and the distortion pattern is recorded and analyzed.

The present invention utilizes the known principle that a plurality of buried or hidden conductive bodies is unlikely to be uniformly oriented throughout their length, unlikely to be capacitively, inductively, resistively, or electrolytically coupled to the ground to the same degree. Consequently, each conductive body will form a unique electromagnetic circuit that can be modeled as some combination or resistors, capacitors, and inductors, even when the services share a common grounding point. By injecting signals which are likely to be distorted into the conductive bodies, as opposed to the multiple sine waves utilized in U.S. Pat. No. 5,574,049, the unique electrical characteristics of each conductive body are revealed by the distorted signal radiated from the conductive body. To facilitate this analysis of distortion, the invention preferably uses signals that exhibit abrupt discontinuities, such as square or sawtooth waveforms.

In a preferred embodiment of the invention, a system is provided that includes a signal generator for creating the initial waveform to be injected into the conductors of interest, a means for coupling the waveform onto the conductors, and a receiving device sensitive to the electromagnetic field emanating from the conductors as a result of the coupled or impressed waveform. In addition, means are preferably provided for displaying and evaluating the waveform radiated by the conductor to provide information as to the conductor's position and unique electrical characteristics, allowing the conductor to be differentiated from other conductors.

For portability, the signal generator of the preferred embodiment of the invention may be a battery powered device which is capable of producing the required short duration signals containing abrupt discontinuities. The signal generator is fitted with means for applying the signal to the utility service by both inductive and conductive means.

In order to enable location determination, the receiver unit preferably has one or more coils acting as magnetic field sensors. The coils are passed over the area suspected to contain the conductive structure. The voltage generated by the sensors as a result of the signal radiated by the energized conductors is digitized and sent to a processor. The received waveform is then either displayed directly, i.e., in the time domain, or is subjected to spectral or other types of waveform analysis before display of the results. The receiver unit may also store the results for future reference by the instrument operator.

The geometric arrangement of the antennas may be conventional, as may the algorithms for determining location based on relative signal strength. By way of example, using two parallel antennas with their axis in alignment and spaced some distance apart allows for the horizontal position of the conductor to be evaluated. Adding a third antenna in the same plane as the first two, but at some distance above them, allows the depth of the conductor to be evaluated.

Unlike the conventional systems, however, the antennas are preferably broadband antennas capable of capturing or sensing all re-radiated frequencies of interest in order to determine waveform shape. This allows the operator to choose the portion of the unique time or frequency domain signature for each energized conductor beneath the receiver unit which best eliminates the influence of interfering conductors.

When the impressed waveform coupling means is a transmitter which is coupled inductively with the conductor of interest, the present invention provides for very short operating distances between the transmitter and receiver unit, which is particularly advantageous when the utility service presents no practical access points. Because the receiver evaluates waveform distortion instead of just signal strength, a stored copy of the transmitted waveform may be subtracted from the signal present on the receive antennas and compared, simplifying processing. This is facilitated by the use of broadband type receive antennas, since the signals received directly from the transmitter will normally be very close to the waveform and/or spectral content of the original signal unless some other conductor is present. Subtracting the known waveform prevents the receiver from being swamped by the very large signal present in close proximity to the transmitter.

BRIEF DESCRIPTION OF THE DRAWINGS

FIGS. 4b and 4c are respective time and frequency domain waveform diagrams for the re-radiated signal corresponding to the injected signal of FIG. 4a.

DETAILED DESCRIPTION OF THE PREFERRED EMBODIMENTS

Figure 1:
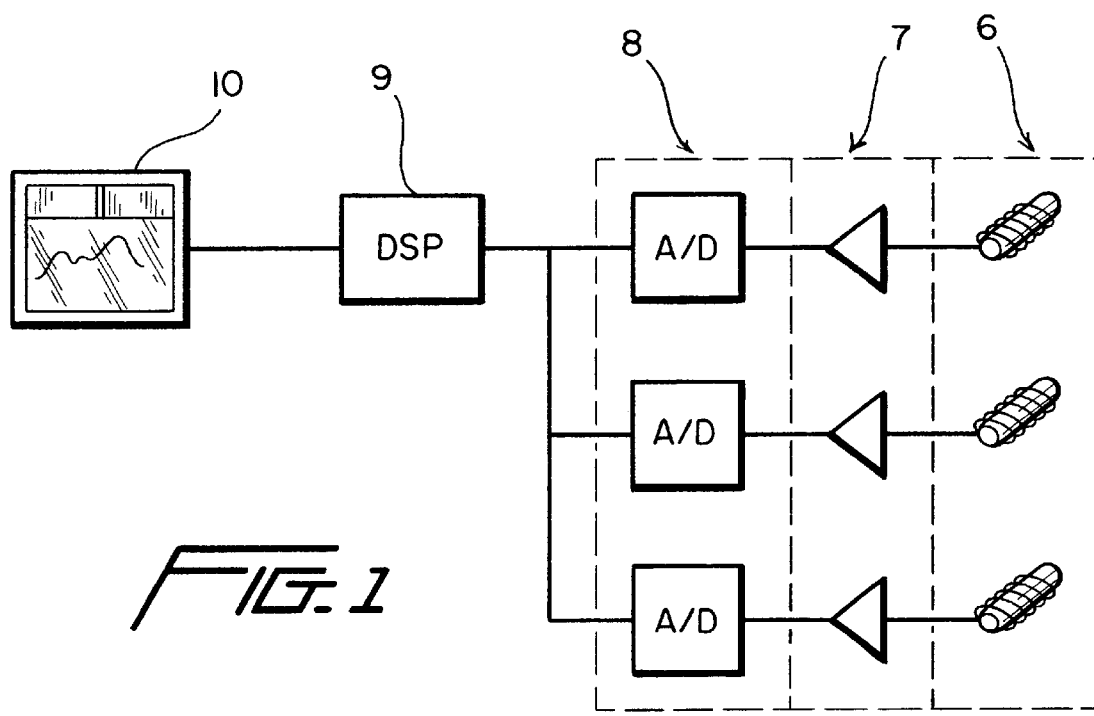
FIG. 1 is a schematic diagram of a system for locating and identifying conductors according to a preferred embodiment of the invention.

As illustrated in FIG. 1, a system for locating and identifying a conductor includes a waveform generator 1 for generating a time-duration limited waveform having relatively sharp discontinuities that are subject to distortion so that changes in the shape of the waveform can be easily detected.

The generated waveform may be conductively coupled directly to the conductor whose position and identity are to be established at a location remote from the point of injection, or the waveform may be inductively coupled to the conductor, using any of a variety of well-known coupling methods or means. By way of example, direct coupling may be achieved by a clamp 2, an electrical connector, or any similar electrical contact-establishing device, while inductive coupling may be achieved either by an inductor 3 placed around the conductor or by means of electromagnetic signals transmitted by an antenna 4. In the case of inductive coupling the power of the injected waveform must be sufficient to penetrate insulators surrounding the conductor.

The signal receiver preferably includes antennas 5 connected to amplifiers 6 and analog-to-digital converters 7. Those skilled in the art will appreciate that the number and configuration of the receivers may be varied in numerous ways without departing from the scope of the invention, and that the signals may be processed in analog form rather than digitally. The illustrated arrangement of antenna, amplifiers, and analog-to-digital converters is intended to be exemplary in nature, and is not intended to limit the invention so long as the antennas have sufficient bandwidth and sensitivity to detect signals radiated from the conductors of interest in response to the injected waveform.

In the case of digital processing, the converted digital signals are supplied to a digital signal processor 9 for analysis and/or display on display screen 10. The analysis seeks to compare the injected waveform with the received waveform to measure the distortion. This can be accomplished either by a complete spectral analysis, or by analysis of received pulse parameters in the time domain, depending on the types of conductors sought. Alternatively, the waveform may simply b e displayed for further analysis by the operator of the receiver.

Figure 2A:
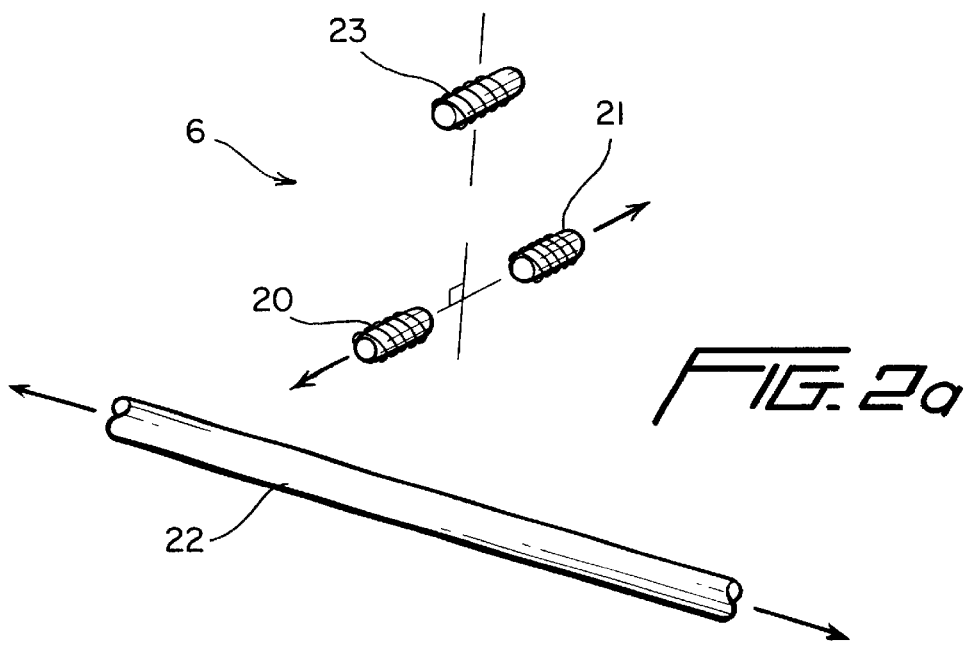
FIG. 2a is a schematic diagram of a receiver arrangement that may be used with the system illustrated in FIG. 1.

In the antenna arrangement shown in FIG. 2, which represents one possible antenna configuration, three broadband antennas are used to receive distorted waveform radiated by the conductor. Two of the antennas 20 and 21 are situated in the same horizontal plane to permit the horizontal position of the conductor 22 to be determined. The sensor closest to the hidden conductor will generally receive the highest intensity signal, and thus the horizontal position can be determined by simply moving the receiver unit until the signals are equal. The depth of the conductor can then be determined by signal decay based on the intensity of the signal received from a third antenna 23 positioned vertically above a midpoint between the first two antenna s 20 and 21.

Figure 3:
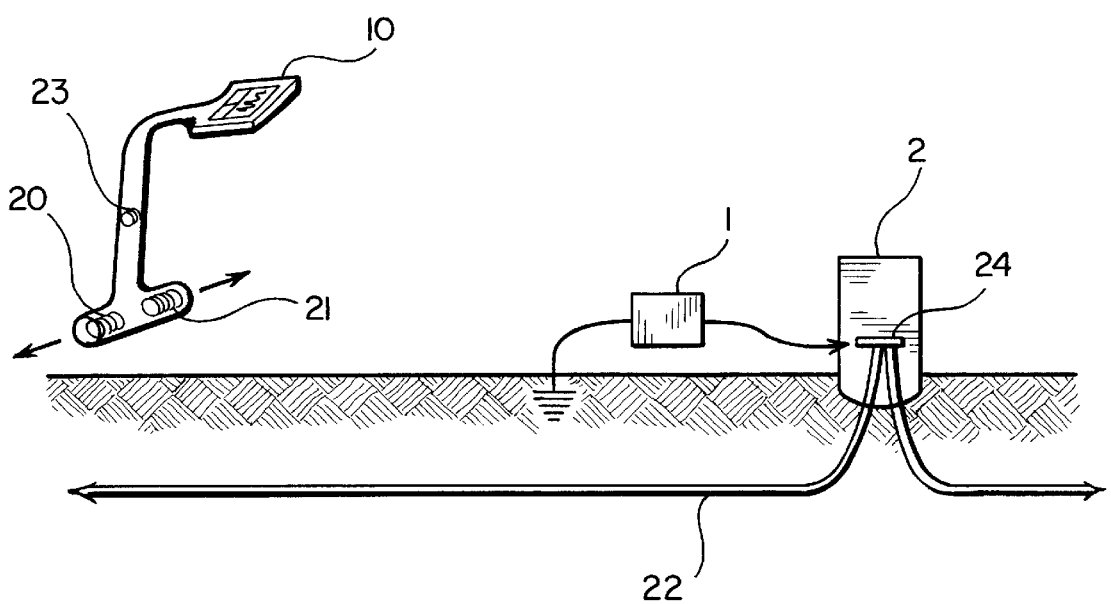
FIG. 3 is a schematic diagram of a particularly preferred implementation of the embodiment of FIG. 1, with conductive injection of the waveform.

FIG. 3 illustrates the manner in which the sensors may be integrated with a display in the receiver unit. In addition, in the arrangement illustrated in FIG. 3, the signal generator 1 is connected to the hidden conductor 22 by direct connection at an above-ground access point 24, although those skilled in the art will appreciate that the system may also utilize inductive coupling as described above.

Figure 4A:
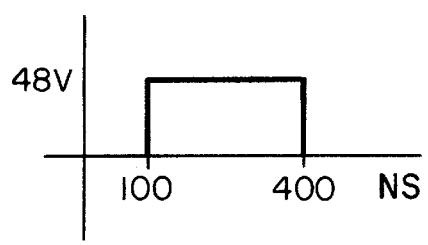
FIG. 4a is a waveform diagram of a suitable injected waveform.

The time-duration limited injected waveform may conveniently be in the form of a square wave, as illustrated in FIG. 4a, since the square wave is the simplest abruptly discontinuous signal to produce and evaluate. Alternatively, the time-duration limited injected waveform may be in the form of a square wave with an inductive kick or flyback, as shown in FIG. 4d, a sawtooth wave, or any other abruptly discontinuous waves could be substituted.

Figure 4B:
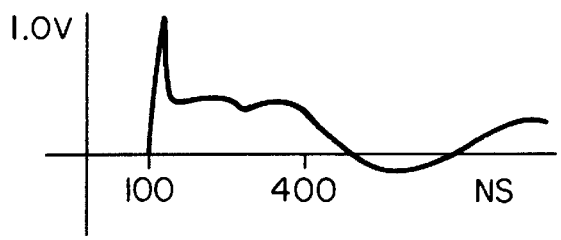
Figure 4C:
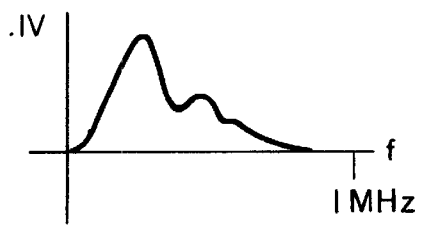
Figure 4D:
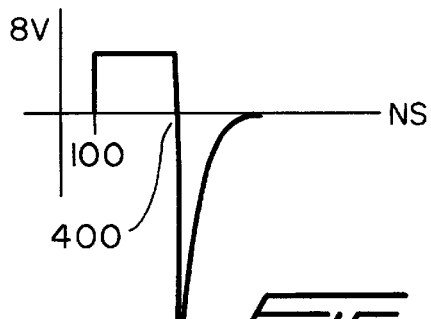
FIG. 4d is a waveform diagram of an injected waveform made up of a square wave with an inductive kick.
Figure 4E:
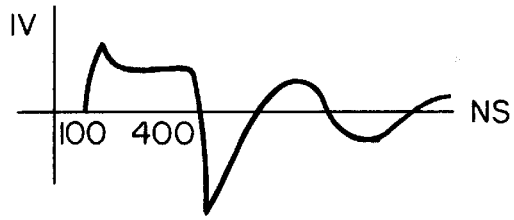
FIGS. 4e and 4f are respective time and frequency domain waveform diagrams for the re-radiated signal corresponding to the injected signal of FIG. 4d.
Figure 4F:
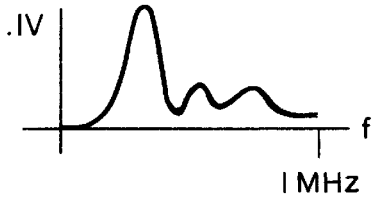

A typical distorted waveform corresponding to the square wave of FIG. 4a applied to a telephone cable is shown in FIG. 4b, and a corresponding Fourier transform of the distorted waveform illustrated in FIG. 4b is shown in FIG. 4c. Respective time and frequency domain waveforms for the injected waveform of FIG. 4d, also applied to a telephone cable, are shown in FIGS. 4e and 4f.

Figure 2B:
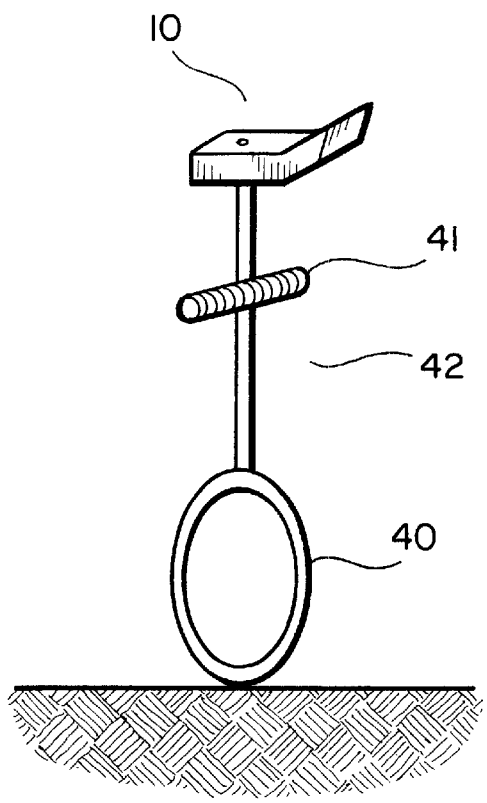
FIGS. 2b and 2c are schematic diagrams of implementations of the embodiment of FIG. 1 in which the transmitter and receiver are mounted on a single moveable structure.
Figure 2C:
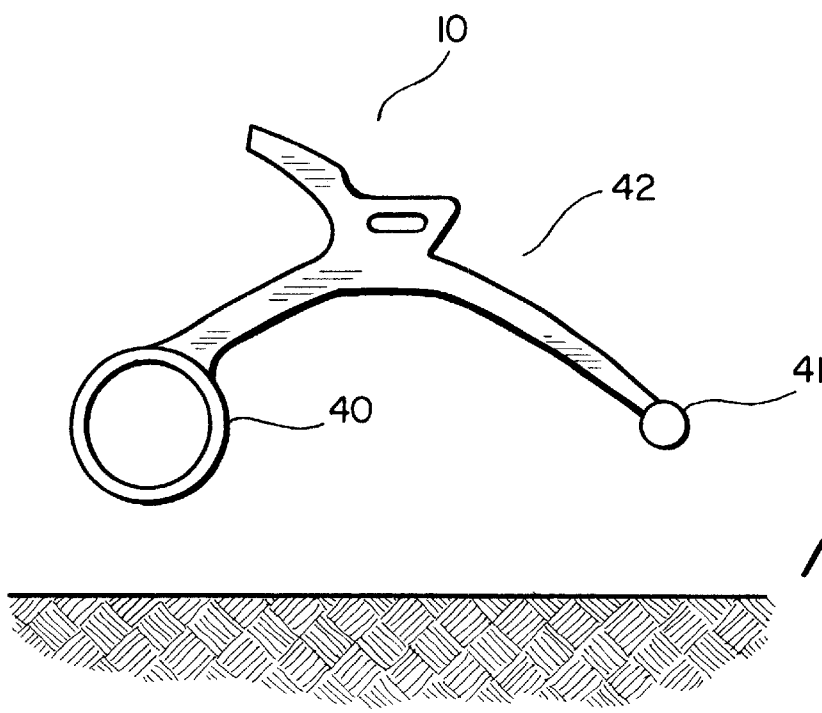

Those skilled in the art will appreciate that in the illustrated examples, the substantial utility response that occurs after the transmit pulse is over has the advantage of permitting the receiver to be placed very close to the transmitter. For example, as illustrated in FIGS. 2b and 2c, the transmitter and receiver may even be placed on the same moveable platform. In these examples, the transmitter and receiver are respectively represented by a transmitter coil 40 and a receiver coil 41, which are mounted or attached to a housing structure 42 that also includes or supports the display unit 10.

Figure 5:
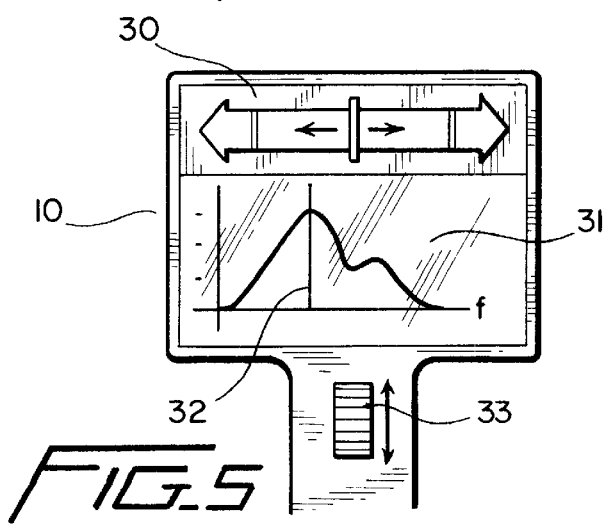
FIG. 5 is a plan view of a display that may be used in connection with the system of FIG. 1.

A suitable display 10 is illustrated in FIG. 5. It includes a left-right indicator 30 that shows the relative signal strength received by the left and right antennas or sensors based on a comparison of the left and right antenna or sensor signals, a display 31 of the received waveform, and a cursor 32 for selecting portions of the waveform most likely to be indicative of conductor-induced distortion for a particular conductor while minimizing interference from adjacent conductors. A cursor position control 33 enables the movement of the cursor by the operator.

Alternatively, the display could include a textual display of calculated signal parameters, a display of predetermined waveforms to enable pattern matching, an identification of the type of conductor deduced from an analysis of the received waveform, a GPS indicator to show the exact geographic location of the conductor, and so forth.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A system for locating and identifying buried conductive bodies, comprising:

a waveform generator;

a receiver including at least one sensor arranged to detect electromagnetic radiation emitted by a buried conductive body when a waveform generated by said waveform generator is impressed upon said conductive body;

a processing unit and a display;

wherein said waveform is time-duration limited and said processing unit is arranged to enable identification of said conductive body based on deviation of a waveform of said electromagnetic radiation from said original waveform, and wherein said processing unit is arranged to locate said conductive bodies based on relative amplitudes of said waveform of said electromagnetic radiation detected by said at least one sensor.

2. A system for locating and identifying buried conductive bodies as recited in claim 1, wherein said time-duration limited waveform exhibits abrupt discontinuities.

3. A system for locating and identifying buried conductive bodies as recited in claim 2, wherein said waveform is a square wave.

4. A system for locating and identifying buried conductive bodies as recited in claim 2, wherein said waveform is a square wave ending in an inductive kick.

5. A system for locating and identifying buried conductive bodies as recited in claim 1, further comprising a coupler arranged to directly inject said waveform into said conductive body.

6. A system for locating and identifying buried conductive bodies as recited in claim 5, wherein said coupler is a clamp.

7. A system for locating and identifying buried conductive bodies as recited in claim 1, further comprising an inductive coupling arranged to inject said waveform into said conductive body.

8. A system for locating and identifying buried conductive bodies as recited in claim 7, wherein said inductive coupling is a coil.

9. A system for locating and identifying buried conductive bodies as recited in claim 1, wherein said at least one sensor is a magnetic field sensor.

10. A system for locating and identifying buried conductive bodies as recited in claim 1, wherein said at least one sensor is a broadband antenna.

11. A system for locating and identifying buried conductive bodies as recited in claim 1, wherein said display includes a display of said waveform of said electromagnetic radiation emitted by the buried conductive body.

12. A system for locating and identifying buried conductive bodies as recited in claim 1, wherein said processing unit is arranged to perform a spectral analysis of said electromagnetic radiation emitted by the buried conductive body.

13. A system for locating and identifying buried conductive bodies as recited in claim 1, wherein said processing unit is arranged to determine parameters of a time domain representation of said electromagnetic radiation emitted by said buried conductive body.

14. A method of locating and identifying buried conductive bodies, comprising the steps of:

generating a time-duration limited waveform;

detecting electromagnetic radiation emitted by a buried conductive body when a waveform generated by said waveform generator is impressed upon said conductive body;

identifying said conductive body based on deviation of a waveform of said electromagnetic radiation from said original waveform, and locating said conductive bodies based on relative amplitudes of said waveform of said electromagnetic radiation.

15. A method of locating and identifying buried conductive bodies as recited in claim 14, wherein said time-duration limited waveform exhibits abrupt discontinuities.

16. A method of locating and identifying buried conductive bodies as recited in claim 14, wherein said waveform is a square wave.

17. A method of locating and identifying buried conductive bodies as recited in claim 14, wherein said waveform is a square wave ending in an inductive kick.

18. A method of locating and identifying buried conductive bodies as recited in claim 14, further comprising the step of directly injecting said waveform into said conductive body.

19. A method of locating and identifying buried conductive bodies as recited in claim 14, further comprising the step of inductively injecting said waveform into said conductive body.

20. A method of locating and identifying buried conductive bodies as recited in claim 14, further comprising the step of performing a spectral analysis of said electromagnetic radiation emitted by the buried conductive body.

21. A method of locating and identifying buried conductive bodies as recited in claim 14, further comprising the step of determining parameters of a time domain representation of said electromagnetic radiation emitted by said buried conductive body.

* * * * *